United States Patent
Tai et al.

(10) Patent No.: US 10,737,566 B2
(45) Date of Patent: Aug. 11, 2020

(54) VEHICLE BODY REAR STRUCTURE

(71) Applicant: HONDA MOTOR CO., LTD., Minato-ku, Tokyo (JP)

(72) Inventors: Hideki Tai, Wako (JP); Junya Harada, Wako (JP); Shouji Yamazaki, Wako (JP); Takashi Sasamoto, Tokyo (JP)

(73) Assignee: Honda Motor Co. Ltd., Tokyo (JP)

( * ) Notice: Subject to any disclaimer, the term of this patent is extended or adjusted under 35 U.S.C. 154(b) by 26 days.

(21) Appl. No.: 16/247,031

(22) Filed: Jan. 14, 2019

(65) Prior Publication Data
US 2019/0233012 A1 Aug. 1, 2019

(30) Foreign Application Priority Data
Jan. 30, 2018 (JP) ................. 2018-014017

(51) Int. Cl.
*B60K 1/04* (2019.01)
*B62D 21/15* (2006.01)
*B62D 25/08* (2006.01)

(52) U.S. Cl.
CPC .............. *B60K 1/04* (2013.01); *B62D 21/152* (2013.01); *B62D 25/087* (2013.01); *B60K 2001/0416* (2013.01); *B60K 2001/0438* (2013.01); *B60Y 2306/01* (2013.01)

(58) Field of Classification Search
CPC ........ B60K 1/04; B62D 21/152; B62D 25/08; B62D 25/20; B62D 25/2027
USPC ............................ 296/187.11, 193.08, 203.04
See application file for complete search history.

(56) References Cited

U.S. PATENT DOCUMENTS

| | | | | |
|---|---|---|---|---|
| 9,956,861 | B2* | 5/2018 | Nomura | B60K 1/04 |
| 10,065,490 | B2* | 9/2018 | Haijima | H01M 2/1083 |
| 10,399,425 | B2* | 9/2019 | Okamura | B62D 21/02 |
| 2014/0021744 | A1* | 1/2014 | Imamura | B62D 21/157 |
| | | | | 296/187.08 |

FOREIGN PATENT DOCUMENTS

| | | | |
|---|---|---|---|
| JP | 2013014312 | A | 1/2013 |
| JP | 2014024453 | A | 2/2014 |
| JP | 2016185739 | A | 10/2016 |

OTHER PUBLICATIONS

Machine translation of Notice of Reasons for Refusal for Japanese application No. 2018-014017, dated Jul. 23, 2019, 3 pages.

* cited by examiner

*Primary Examiner* — Jason S Daniels
(74) *Attorney, Agent, or Firm* — Armstrong Teasdale LLP

(57) ABSTRACT

To protect a battery pack supported in a rear end part of a vehicle body at the time of a rear end crash, the vehicle body rear structure comprises: a pair of left and right rear side frames (10) extending in a fore and aft direction in a laterally spaced apart relationship; a rear floor panel (14) attached to the rear side frames (10) and defining a battery receiving space (40) for receiving a battery pack therein; and a load transmitting member (46) having a front end (46A) fixedly secured to a structural member (24) of the vehicle body and extending to a rear end (46B) thereof located behind the battery receiving space.

12 Claims, 4 Drawing Sheets

VEHICLE BODY REAR STRUCTURE

TECHNICAL FIELD

The present invention relates to a vehicle body rear structure, and in particular to a vehicle body rear structure for vehicles such as hybrid vehicles and electric vehicles that are provided with a battery pack for powering the electric motor for propelling the vehicle in a rear part thereof.

BACKGROUND ART

In a vehicle body rear structure for a vehicle provided with a battery pack for powering the electric motor for propelling the vehicle in a rear part thereof, it is known to support the battery pack in a rear cargo space with a pair of support frames extending in the fore and aft direction in parallel to each other, and to curve the rear end parts of the support frames away from each other so as to extend along the rear end of the battery pack. See JP2014-024453A.

According to this vehicle body rear structure, at the time of a rear end crash, the impact of the crash is absorbed by the deformation of the curved parts so that the battery pack is protected from the impact.

However, according to this vehicle body rear structure, the impact of a rear end crash can be absorbed only as long as the deformation of the support frames progresses. Therefore, upon completion of the deformation of the support frames, no further absorption of the impact can be expected so that the battery pack can be protected from the impact only to a certain extent.

SUMMARY OF THE INVENTION

In view of such a problem of the prior art, a primary object of the present invention is to provide a vehicle body rear structure which allows a battery pack supported in a rear end part of the vehicle body to be favorably protected from impact at the time of a rear end crash.

To achieve such an object, the present invention provides a vehicle body rear structure, comprising: a pair of left and right rear side frames (10) extending in a fore and aft direction in a laterally spaced apart relationship, a rear floor panel (14) attached to the rear side frames (10) and defining a battery receiving space (40) for receiving a battery pack therein, and a load transmitting member (46) having a front end (46A) fixedly secured to a structural member (24) of the vehicle body and extending to a rear end (46B) thereof located behind the battery receiving space.

According to this arrangement, the bending moment applied to the rear side frames (10) at the time of a rear end crash is favorably supported by the load transmitting member (46) so that the rear side frames (10) are prevented from undergoing a bending deformation. Thereby, the battery pack (38) positioned in the battery receiving space (40) is effectively protected from the impact load of a rear end collision.

Preferably, in this vehicle body rear structure, the load transmitting member includes a pair of load transmitting members extending in the fore and aft direction on either side of the battery receiving space.

Thereby, the battery pack (38) positioned in the battery receiving space (40) is particularly favorably protected from the impact load of a rear end collision.

Preferably, in this vehicle body rear structure, the structural member (24) includes a bulkhead member (24) fixedly secured to the rear side frames (10) to separate a passenger compartment (22) from a rear cargo space (20), and the front end (64A) of each load transmitting member (46) is fixedly secured to the bulkhead member (24).

Thereby, the impact from the rear can be transmitted from the front end (64A) of the load transmitting members (46) to the bulkhead member (24) so that the impact can be transmitted from the rear end of the vehicle to a more front part of the vehicle body.

Preferably, the vehicle body rear structure further comprises a rear panel (16) connected to a rear end of the rear floor panel (14) and extending in a lateral direction, and the rear ends (46B) of the load transmitting members (46) are fixedly secured to the rear panel (16).

Thereby, the impact load at the time of a rear end crash is transmitted not only from the rear panel (16) to the rear side frames (10), and but also from the rear panel (16) to the bulkhead member (24) by the load transmitting members (46) so that the deformation of the rear part of the vehicle body is favorably controlled. As a result, the transmission of the rear impact load to the battery pack (38) in the battery receiving space (40) is minimized, and the battery pack (38) is favorably protected from the impact load of a rear end crash.

Preferably, the load transmitting members (46) are each formed by a linear beam member including a part overlapping with the corresponding rear side frame (10) in plan view.

Thereby, the load transmitting members (46) are made resistant to bending when subjected to an impact load from the rear, and this in turn makes the rear side frames resistant against bending deformation so that the battery pack (38) is favorably protected from the impact load of a rear end crash.

Preferably, each rear side frame (10) includes a curved portion (10A) curved upward, and each load transmitting member (46) includes a part overlapping with a part of the corresponding rear side frame including the curved portion (10A) in plan view.

Thereby, in spite of the presence of the curved portion (10A) in each rear side frame (10), the bending moment applied to the rear side frames (10) at the time of a rear end crash is favorably supported by the load transmitting members (46).

Preferably, the vehicle body rear structure further comprises a pair of intermediate support members (52) each having a lower end (52A) connected to the rear floor panel (14) and an upper end (52B) connected to an intermediate part of the corresponding load transmitting member (46).

Thereby, the rear side frames (10) and the load transmitting members (46) jointly provide a high bending stiffness so that the rear side frames (10) and the load transmitting members (46) are protected from excessive bending deformation.

Preferably, the rear floor panel (14) includes a bulging part (36) bulging upwardly in rear view so as to define the battery receiving space (40) on a lower side thereof, and the vehicle body structure further comprises a cargo space floor panel (42) positioned on the bulging part to define a floor surface of the rear cargo space, the load transmitting members being positioned in spaces (44), respectively, defined between the rear floor panel and the cargo space floor panel on either side of the bulging part.

Thereby, the load transmitting members can be accommodated in a space which is otherwise wasted so that the presence of the load transmitting members does not reduce the volume of the rear cargo space.

The present invention thus provides a vehicle body rear structure which allows a battery pack supported in a rear end part of the vehicle body to be favorably protected from impact at the time of a rear end crash.

BRIEF DESCRIPTION OF THE DRAWING(S)

DESCRIPTION OF THE PREFERRED EMBODIMENT(S)

Figure 1:
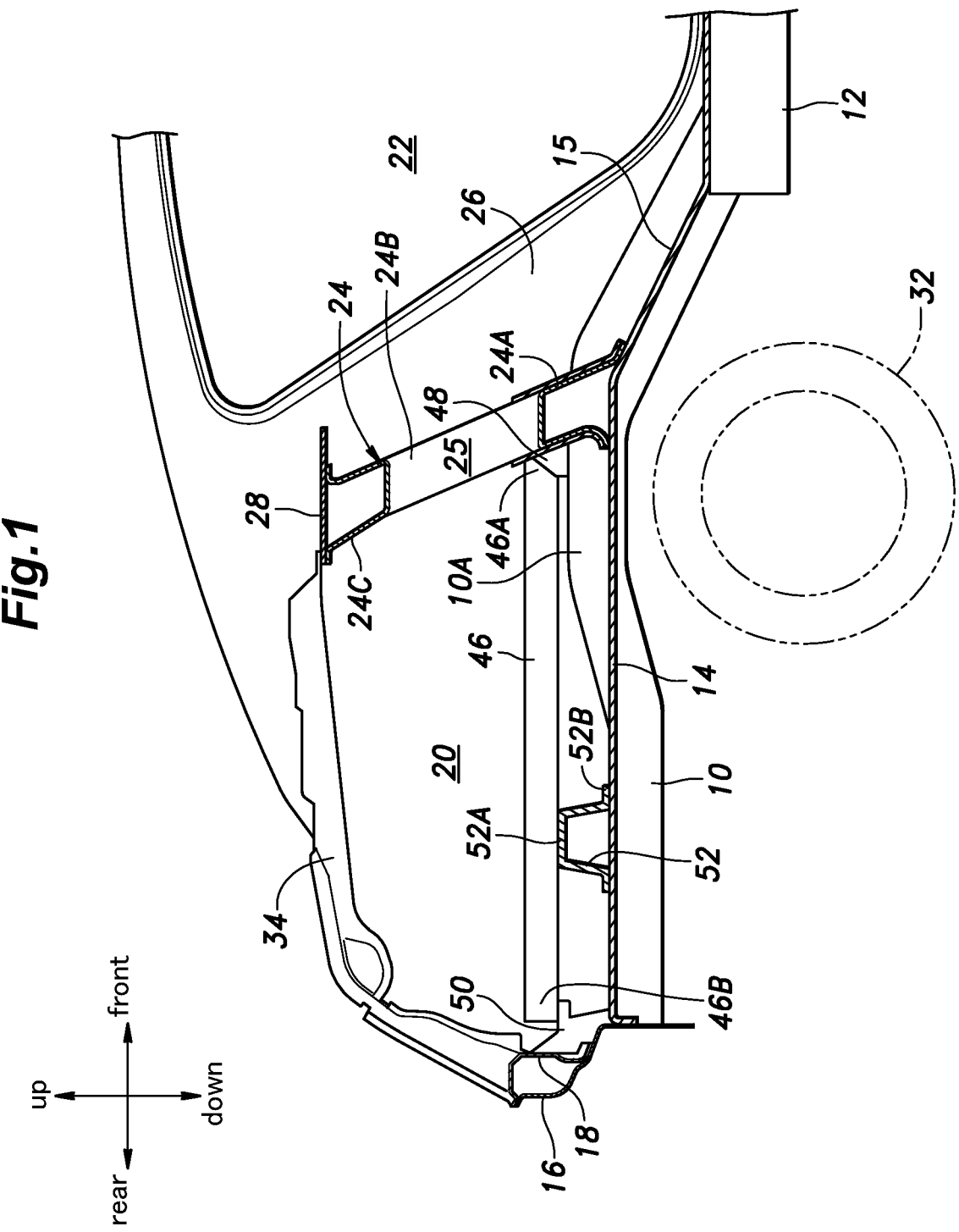
FIG. 1 is a simplified sectional side view of a rear end part of a vehicle body according to an embodiment of the present invention.
Figure 2:
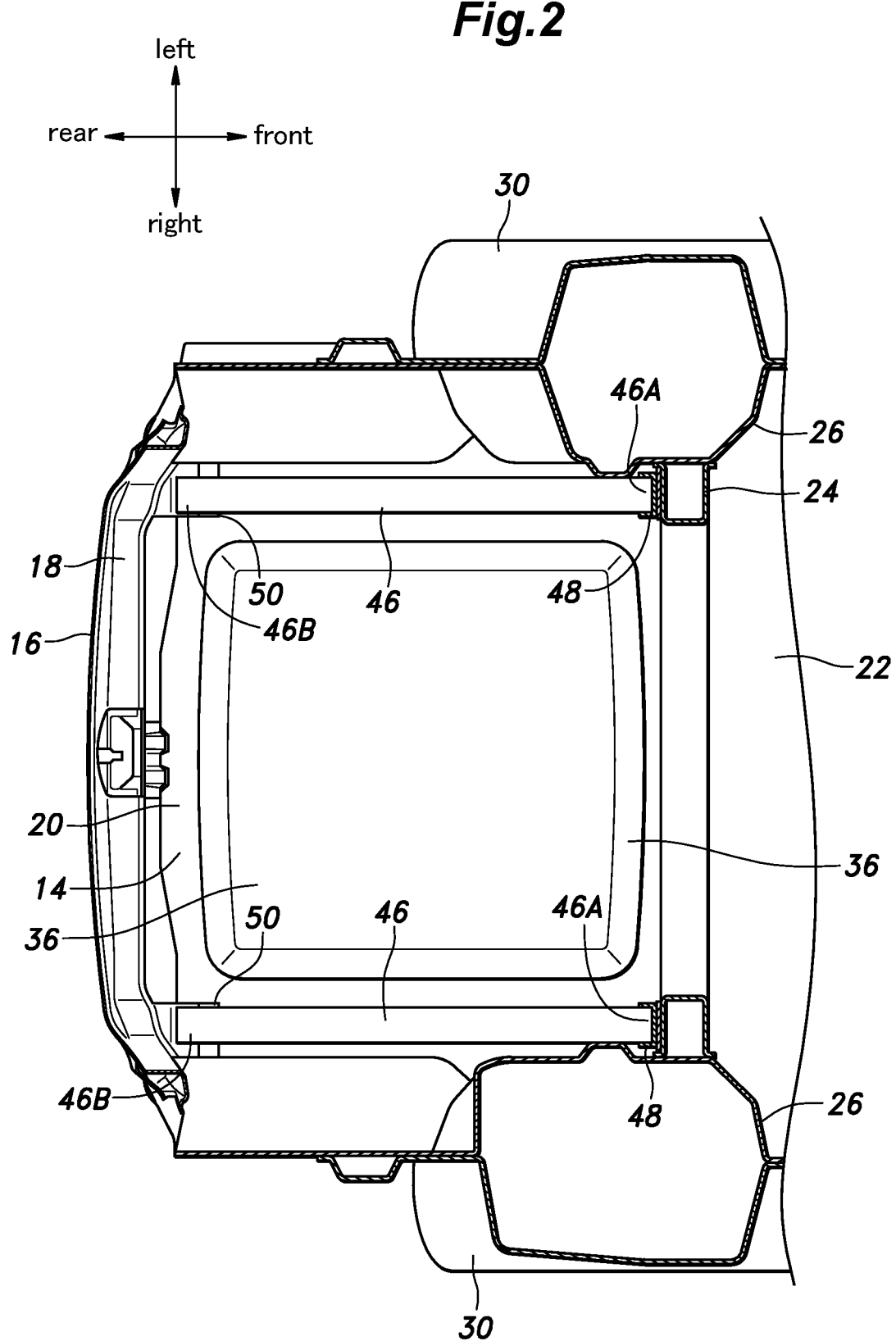
FIG. 2 is a sectional plan view of the rear end part of the vehicle body.
Figure 3:
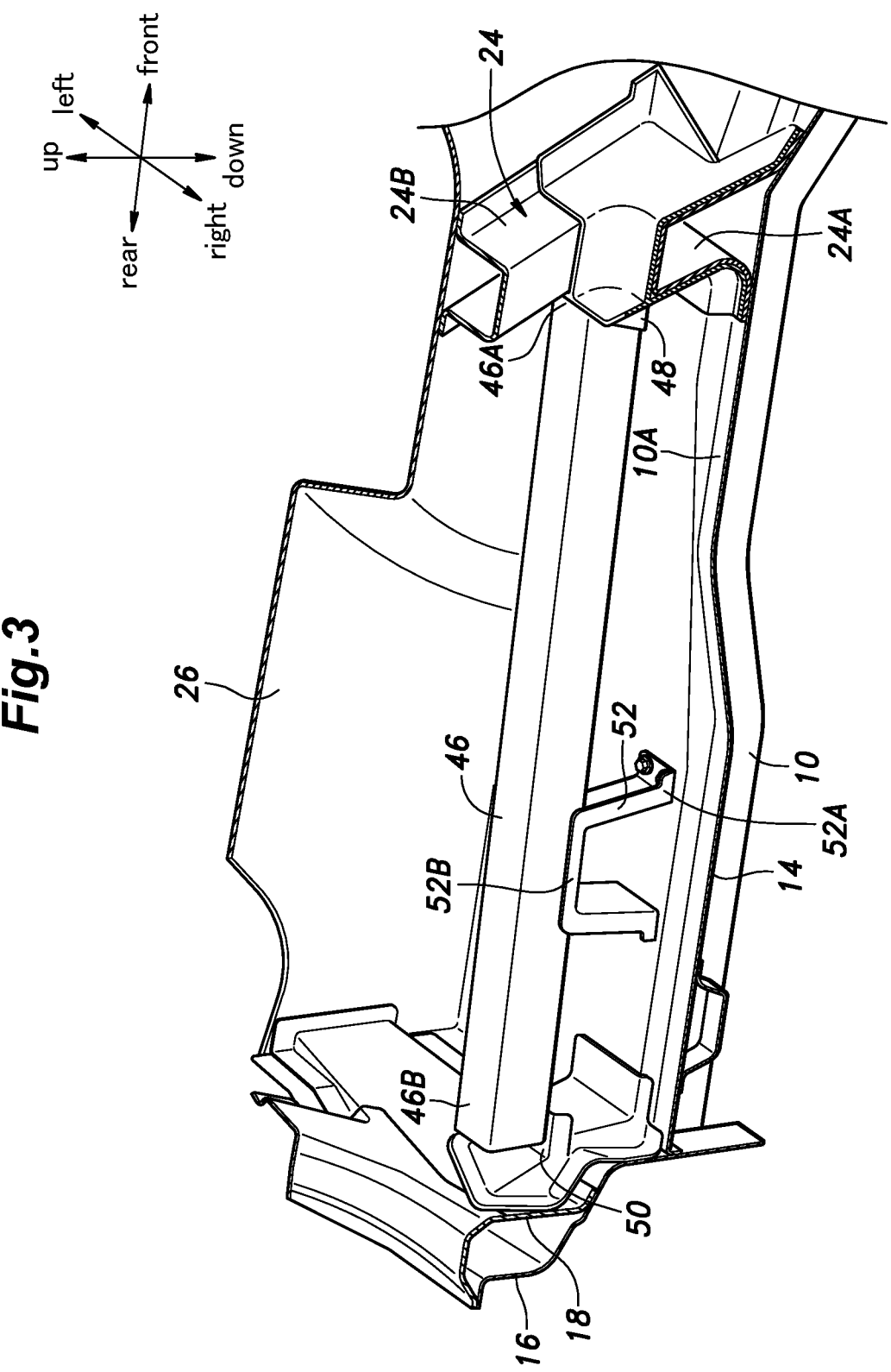
FIG. 3 is a fragmentary sectional perspective view of a part of the rear end part of the vehicle body.

A preferred embodiment of the present invention is described in the following with reference to the appended drawings.

A vehicle body rear structure is provided with a pair of left and right rear side frames 10 extending in the fore and aft direction. The front ends of the rear side frame 10 are connected to the rear ends of respective side sill 12. A rear floor panel 14 is attached to the rear side frames 10. A rear panel 16 extending in the lateral direction is attached to rear end parts of the rear side frames 10 and the rear edge of the rear floor panel 14.

A rear panel cross member 18 extending in the lateral direction is attached to the front side of the rear panel 16. The rear panel cross member 18 consists of a channel member having an open side facing rearward so that a closed cross section is jointly formed by the rear panel cross member 18 and the rear panel 16.

A bulkhead member 24 extends laterally so as to separate a rear cargo space 20 from a passenger compartment 22, and has a lower end part 24A that is attached to the rear side frames 10 via the rear floor panel 14. The bulkhead member 24 is one of structural members forming the vehicle body, and is provided with a rectangular frame shape having a rectangular opening 25 defined therein. The bulkhead member 24 is formed by joining channel members extending along four sides of the bulkhead member 24. In addition to the lower end part 24A, the bulkhead member 24 includes a pair of column parts 24B attached to the corresponding side panels 26, and an upper beam part 24C is attached to a rear parcel shelf 28 extending laterally along a horizontal plane. Thereby, the bulkhead member 24 defines a closed cross section along the four sides thereof in cooperation with the rear floor panel 14, the side panels 26 and the rear parcel shelf 28.

The rear side frames 10 and the rear floor panel 14 are raised as they extend from the passenger compartment 22 to the rear cargo space 20 so as to form a kick-up portion 15. The rear cargo space 20 is located behind the kick-up portion 15, and the bulkhead member 24 is located between the kick-up portion 15 and the rear cargo space 20. Further, each rear side frame 10 includes a curved portion 10A that is curved upward in a part located behind the bulkhead member 24 and corresponding to the rear cargo space 20. More specifically, each rear side frame 10 is provided with a first horizontal section immediately behind the kick-up portion 15, a downwardly slanted section extending rearward from the rear end of the first horizontal section, and a second horizontal section extending rearward from the rear end of the downwardly slanted section. The rear floor panel 14 extends substantially horizontally from the kick-up portion 15 to the rear edge of the rear floor panel 14.

A rear wheel house 30 is attached to each side panel 26. A rear wheel 32 (see FIG. 1) is disposed inside each rear wheel house 30.

A pair of gutter frames 34 extend along either upper side of the rear cargo space 20, and have rear ends connected to the rear panel cross member 18 and front ends connected to the upper beam part 24C of the bulkhead member 24.

A bulging part 36 bulging or protruding upward is formed in a laterally central part of the rear floor panel 14. In this embodiment, the bulging part 36 has a trapezoidal shape in cross section orthogonal to the fore and aft direction (or in rear view), and a space defined under the bulging part 36 of the rear floor panel 14 serves as a battery receiving space 40 for accommodating a battery pack 38 for powering the motor for driving the vehicle which may be a hybrid vehicle or an electric vehicle.

Figure 4:
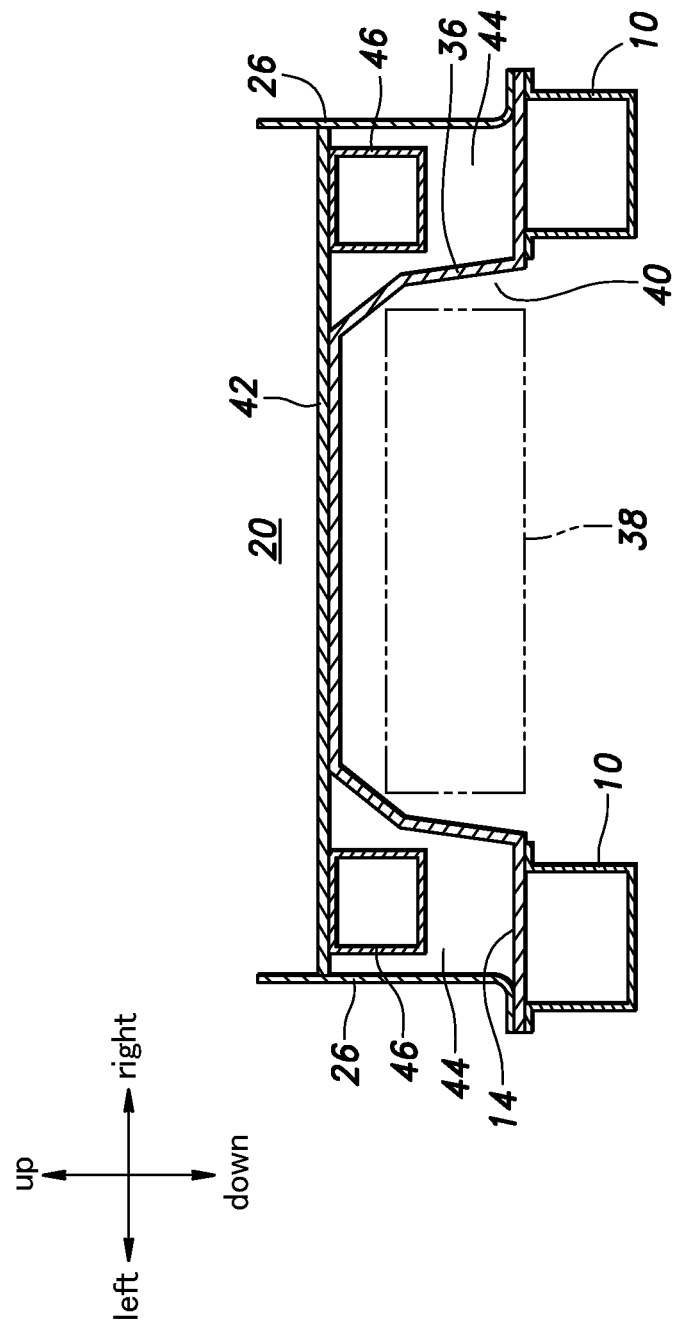
FIG. 4 is a sectional front view of the rear end part of the vehicle body.

A cargo space floor panel 42 (see FIG. 4) is placed on the bulging part 36 so that a pair of closed spaces 44 extending between the rear panel 16 and the bulkhead member 24 are defined by the rear floor panel 14, the cargo space floor panel 42, and the side panel 26 on either side of the bulging part 36.

A load transmitting member 46 is positioned in each closed space 44. The load transmitting member 46 is formed by a linear hollow steel pipe having a rectangular cross section (beam member) extending substantially horizontally in the fore and aft direction, and has a front end 46A connected to the bulkhead member 24 via a front support member 48, and a rear end 46B connected to the rear panel 16 and the rear panel cross member 18 via a rear support member 50. The front end 46A and the rear end 46B of each load transmitting member 46 are connected to the front support member 48 and the rear support member 50, respectively, by welding or by using fasteners.

Each load transmitting member 46 is generally located above the corresponding rear side frame 10, and at least partly overlaps with the corresponding rear side frame 10 in plan view. In particular, each load transmitting member 46 includes a part located above the curved portion 10A of the corresponding rear side frame 10, and overlaps with the corresponding curved portion 10A in plan view.

The battery receiving space 40 is located in front of the rear panel 16 and the rear panel cross member 18 so that the rear end 46B of each load transmitting member 46 attached to the rear panel 16 and the rear panel cross member 18 via the rear support member 50 is located behind battery receiving space 40.

An intermediate part of each load transmitting member 46 is supported by an intermediate support member 52 which is fixedly attached to the rear floor panel 14. The intermediate support member 52 has a lower end 52A fixedly secured to the rear floor panel 14 and an upper end 52B fixedly secured to the bottom side of the load transmitting member 46.

According to the rear structure of the vehicle body discussed above, the impact load at the time of a rear end crash is transmitted from the rear panel 16 to the rear side frames 10, and then to the side sills 12. The impact load is also transmitted from the rear panel 16 to the bulkhead member 24 via the load transmitting members 46. Thereby, the rear structure of the vehicle body is resistant to the rear impact load so that the battery pack 38 received in the battery receiving space 40 is protected from the rear impact.

Further, the moment applied to the rear side frames 10 at the time of a rear end crash is supported by the load transmitting members 46 so that the rear side frames 10 are made resistant to deformation. In particular, since the load transmitting members 46 are each formed by a linear beam member or a linear member having a certain cross sectional shape (such as pipe, channel or angle member) that provides a high bending stiffness (and mechanical strength), the rear side frames 10 are particularly favorably reinforced by the load transmitting members 46 against bending deformation. This allows the battery pack 38 received in the battery receiving space 40 to be particularly favorably protected from the rear impact of a rear end crash. This effect is particularly enhanced because the load transmitting members 46 each include a part overlapping with the corresponding rear side frame 10 in plan view.

The rear end 46B of each load transmitting member 46 extends rearward beyond the rear end of the battery receiving space 40, and is fixedly secured to the rear panel 16. Therefore, the battery pack 38 received in the battery receiving space 40 is protected from the rear impact in a particularly favorable manner.

Furthermore, since the intermediate part of each load transmitting member 46 is connected to the corresponding rear side frame 10 via the intermediate support member 52 and the rear floor panel 14, the rear side frame 10 and the load transmitting member 46 cooperate each other so as to increase the bending stiffness of the rear structure of the vehicle body. Thus, the rear structure of the vehicle body is made highly resistant to deformation at the time of a rear end crash. This contributes to the protection of the battery pack 38 against the rear impact of a rear end crash.

The load transmitting members 46 are also beneficial when the rear side frames 10 are each provided with a curved portion 10A so as to conform to the shape of the rear floor panel 14 and the rear wheel house 30. In such a case also, the load transmitting members 46 are effective in controlling the moment applied to the rear side frames 10 at the time of a rear end crash.

Since each load transmitting member 46 is positioned in the closed space 44 which is a dead space below the cargo space floor panel 42, the load transmitting members 46 do not reduce the volumetric capacity of the rear cargo space 20. In addition, since the load transmitting members 46 extend along either side of the battery pack 38 of the battery receiving space 40 in the respective closed spaces 44, the load transmitting members 46 are also effective in protecting the battery pack 38 against the side impact of a side crash.

Although the present invention has been described in terms of a preferred embodiments thereof, as can be appreciated by a person skilled in the art, the present invention is not limited to such an embodiment, but may be modified and substituted without departing from the spirit of the present invention. For example, the load transmitting members 46 are not limited to steel pipe members having a square cross section, but may also be formed by a channel member, an angle member, an I-beam member or the like. The front end 46A of each load transmitting member 46 may be fixedly secured to a structural member other than the bulkhead member 24 such as the corresponding rear wheel house 30. Further, the load transmitting members 46 may be substantially overlapping with the corresponding side frames 10. Alternatively, the load transmitting members 46 may be offset laterally from the corresponding side frames 10.

The invention claimed is:

1. A vehicle body rear structure, comprising:
a pair of left and right rear side frames extending in a fore and aft direction in a laterally spaced apart relationship;
a rear floor panel attached to the rear side frames and defining a battery receiving space for receiving a battery pack therein; and
a load transmitting member having a front end fixedly secured to a structural member of the vehicle body and extending to a rear end thereof located behind the battery receiving space,
wherein the load transmitting member includes a pair of load transmitting members extending in the fore and aft direction on either side of the battery receiving space, and
wherein the load transmitting members are each formed by a linear beam member including a part overlapping with the corresponding rear side frame in plan view.

2. The vehicle body rear structure according to claim 1, wherein the structural member includes a bulkhead member fixedly secured to the rear side frames to separate a passenger compartment from a rear cargo space, and the front end of each load transmitting member is fixedly secured to the bulkhead member.

3. The vehicle body rear structure according to claim 1, further comprising a rear panel connected to a rear end of the rear floor panel and extending in a lateral direction, and the rear ends of the load transmitting members are fixedly secured to the rear panel.

4. The vehicle body rear structure according to claim 1, wherein the rear floor panel includes a bulging part bulging upwardly in rear view so as to define the battery receiving space on a lower side thereof, and the vehicle body structure further comprises a cargo space floor panel positioned on the bulging part to define a floor surface of the rear cargo space, the load transmitting members being positioned in spaces, respectively, defined between the rear floor panel and the cargo space floor panel on either side of the bulging part.

5. A vehicle body rear structure, comprising:
a pair of left and right rear side frames extending in a fore and aft direction in a laterally spaced apart relationship;
a rear floor panel attached to the rear side frames and defining a battery receiving space for receiving a battery pack therein; and
a load transmitting member having a front end fixedly secured to a structural member of the vehicle body and extending to a rear end thereof located behind the battery receiving space,
wherein the load transmitting member includes a pair of load transmitting members extending in the fore and aft direction on either side of the battery receiving space, and
wherein each rear side frame includes a curved portion curved upward, and each load transmitting member includes a part overlapping with a part of the corresponding rear side frame including the curved portion in plan view.

6. The vehicle body rear structure according to claim 5, wherein the structural member includes a bulkhead member fixedly secured to the rear side frames to separate a passenger compartment from a rear cargo space, and the front end of each load transmitting member is fixedly secured to the bulkhead member.

7. The vehicle body rear structure according to claim 5, further comprising a rear panel connected to a rear end of the rear floor panel and extending in a lateral direction, and the rear ends of the load transmitting members are fixedly secured to the rear panel.

8. The vehicle body rear structure according to claim 5, wherein the rear floor panel includes a bulging part bulging upwardly in rear view so as to define the battery receiving space on a lower side thereof, and the vehicle body structure further comprises a cargo space floor panel positioned on the bulging part to define a floor surface of the rear cargo space, the load transmitting members being positioned in spaces, respectively, defined between the rear floor panel and the cargo space floor panel on either side of the bulging part.

9. A vehicle body rear structure, comprising:
a pair of left and right rear side frames extending in a fore and aft direction in a laterally spaced apart relationship;
a rear floor panel attached to the rear side frames and defining a battery receiving space for receiving a battery pack therein; and
a load transmitting member having a front end fixedly secured to a structural member of the vehicle body and extending to a rear end thereof located behind the battery receiving space,
wherein the load transmitting member includes a pair of load transmitting members extending in the fore and aft direction on either side of the battery receiving space, and,
wherein the vehicle body rear structure further comprises a pair of intermediate support members each having a lower end connected to the rear floor panel and an upper end connected to an intermediate part of the corresponding load transmitting member.

10. The vehicle body rear structure according to claim 9, wherein the structural member includes a bulkhead member fixedly secured to the rear side frames to separate a passenger compartment from a rear cargo space, and the front end of each load transmitting member is fixedly secured to the bulkhead member.

11. The vehicle body rear structure according to claim 9, further comprising a rear panel connected to a rear end of the rear floor panel and extending in a lateral direction, and the rear ends of the load transmitting members are fixedly secured to the rear panel.

12. The vehicle body rear structure according to claim 9, wherein the rear floor panel includes a bulging part bulging upwardly in rear view so as to define the battery receiving space on a lower side thereof, and the vehicle body structure further comprises a cargo space floor panel positioned on the bulging part to define a floor surface of the rear cargo space, the load transmitting members being positioned in spaces, respectively, defined between the rear floor panel and the cargo space floor panel on either side of the bulging part.

* * * * *